United States Patent [19]

King

[11] Patent Number: 5,345,154
[45] Date of Patent: Sep. 6, 1994

[54] ELECTRIC CONTINUOUSLY VARIABLE TRANSMISSION AND CONTROLS FOR OPERATION OF A HEAT ENGINE IN A CLOSED-LOOP POWER-CONTROL MODE

[75] Inventor: Robert D. King, Schenectady, N.Y.

[73] Assignee: General Electric Company, Schenectady, N.Y.

[21] Appl. No.: 23,537

[22] Filed: Feb. 26, 1993

[51] Int. Cl.$^5$ .............................................. H02P 7/67
[52] U.S. Cl. ........................................ 318/49; 318/35;
 318/51; 318/60; 318/67; 318/87; 318/139;
 318/140; 318/150; 318/161; 318/432; 318/803
[58] Field of Search ...................................... 318/34–37,
 318/45–46, 49, 51, 53–64, 65–84, 86–89,
 101–103, 113, 140, 141–158, 161, 139, 255–279,
 375–381, 382, 432, 798–818

[56] References Cited

U.S. PATENT DOCUMENTS

| | | | |
|---|---|---|---|
| 3,745,441 | 7/1973 | Soffer et al. | 318/142 X |
| 4,187,436 | 2/1980 | Etienne | 318/139 X |
| 4,495,451 | 1/1985 | Barnard | 318/150 X |
| 4,631,455 | 12/1986 | Taishoff | 318/37 |
| 5,166,593 | 11/1992 | De Doncker et al. | 318/800 |

OTHER PUBLICATIONS

Hybrid Vehicle Program Final Report, Contract No. 955190, General Electric Corporate Research and Development, Nov. 30, 1983, SRD-83-031.
Technical Note: New Engine for Saab 900, International Journal of Vehicle Design, vol. 10, 1989, pp. 262–267.
R. D. King et al., "High–Performance ETX–11 70–hp Permanent Magnet Motor Electric Drive System", Electric Vehicle Assoc. of Canada, Toronto, Ontario, Canada, Nov. 13–16, 1988.

*Primary Examiner*—Bernard Roskoski
*Assistant Examiner*—David Martin
*Attorney, Agent, or Firm*—Jill M. Breedlove; Marvin Snyder

[57] ABSTRACT

A heat engine operates an alternator that supplies electrical power to an electric continuously variable transmission for driving at least one ac motor through a differential to multiple wheels or to multiple independent ac wheel motors in an automobile, bus or truck. A heat engine control operates in a closed-loop power mode and decouples heat engine speed from motor speed, allowing the heat engine to produce required power at an operating speed and throttle position, or fuel injector duty cycle, that maximizes fuel economy and minimizes engine emissions. An energy storage unit (e.g., a battery, flywheel, ultracapacitor, superconducting magnetic energy storage device, or combination thereof) provides electrical energy to the electric drive system during vehicle accelerations and further reduces peak power demands on the heat engine. Advantageously, energy is recovered during vehicle deceleration and braking; and the recovered energy is used to recharge the energy storage unit. Emissions during cold starting and idling are minimized by a closed-loop temperature-controlled catalyst electric heater which is operated by the battery or the alternator.

27 Claims, 5 Drawing Sheets

ELECTRIC CONTINUOUSLY VARIABLE TRANSMISSION AND CONTROLS FOR OPERATION OF A HEAT ENGINE IN A CLOSED-LOOP POWER-CONTROL MODE

FIELD OF THE INVENTION

The present invention relates generally to electric drive systems and, more particularly, to an electric continuously variable transmission and controls for operation of a heat engine in a closed-loop power-control mode in order to optimize fuel economy and minimize engine emissions.

BACKGROUND OF THE INVENTION

Conventional delivery vehicles, trucks and buses have power trains that combine a gasoline or diesel engine, a clutch mechanism, and either a multispeed standard or automatic transmission. In general, the design of these power trains is the same, regardless if the intended use of the vehicle is high speed cross country driving or urban stop-and-go driving wherein a large portion of time is spent waiting for stop lights, loading or unloading passengers, or idling while deliveries are made. Unfortunately, the result is poor air quality in many urban areas.

Furthermore, with more than one hundred cities in violation of clean air requirements, the U.S. government has promulgated increasingly stringent emissions regulations.

Accordingly, it is desirable to provide a new power train for automobiles, trucks and buses which maximizes fuel economy while minimizing engine emissions.

SUMMARY OF THE INVENTION

A heat engine operates an alternator that supplies electrical power to an electric continuously variable transmission for driving at least one ac motor through a differential to multiple wheels or for driving multiple independent ac wheel motors in an automobile, bus or truck. A heat engine control operates in a closed-loop power mode and decouples heat engine speed from motor speed, allowing the heat engine to produce required power at an operating speed and throttle position, or fuel injector duty cycle, that maximizes fuel economy and minimizes engine emissions. In the preferred embodiment, an energy storage unit (e.g., a battery, flywheel, ultracapacitor, superconducting magnetic energy storage device, or combination thereof) provides electrical energy to the electric drive system during vehicle accelerations and further reduces peak power demands on the heat engine. Advantageously, energy is recovered during vehicle deceleration and braking; and the recovered energy is used to recharge the energy storage unit. Emissions during cold starting and idling are minimized by a closed-loop temperature-controlled catalyst heater which is operated by the energy storage unit or the alternator.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
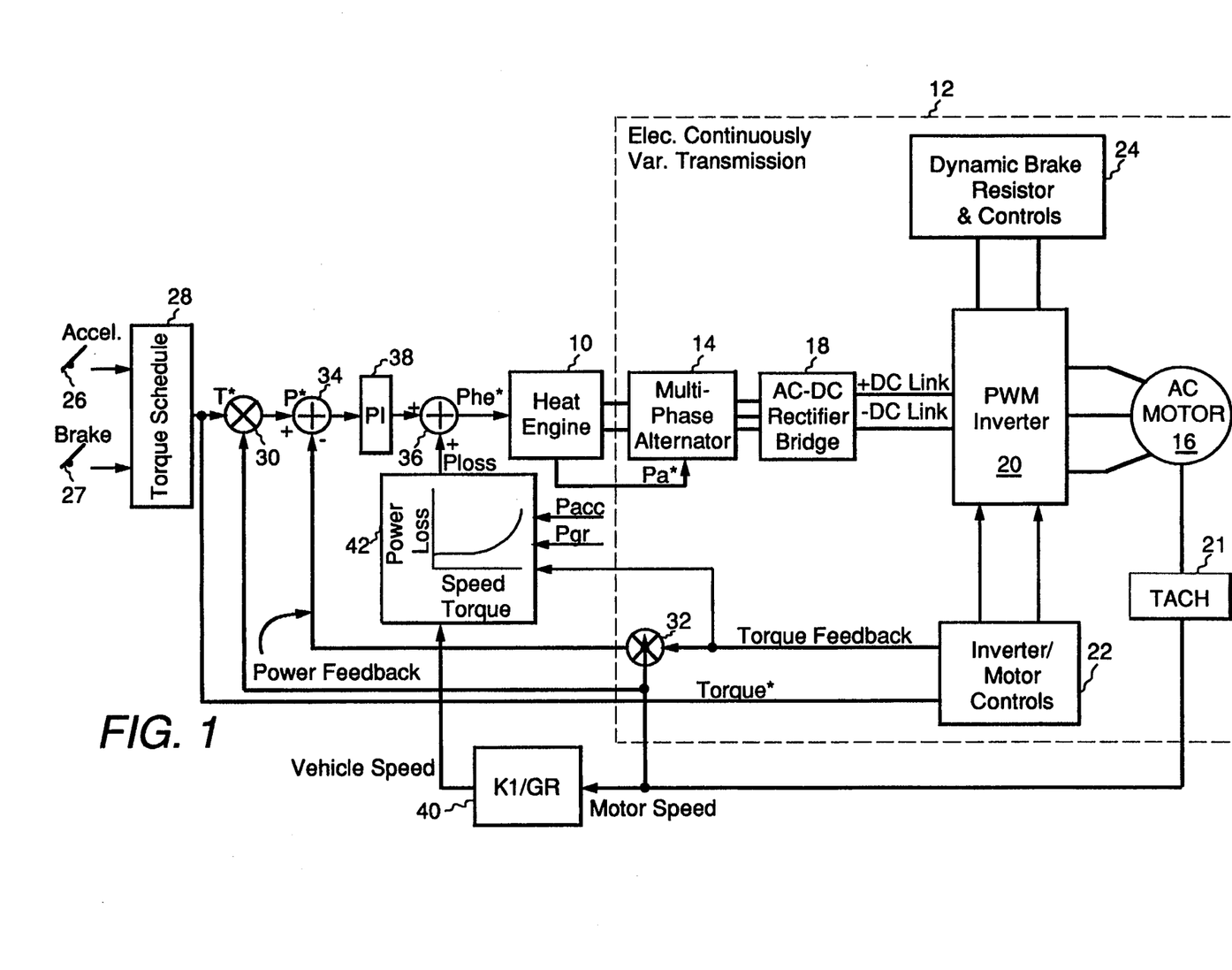
FIG. 1 is a block diagram illustrating an electric drive system employing an electric continuously variable transmission according to the present invention.

FIG. 1 illustrates an electric drive system, including a closed-loop, power-controlled heat engine 10 and an electric continuously variable transmission 12, suitable for efficiently propelling an automobile, bus, truck or other vehicle with low engine emissions. Electric continuously variable transmission 12 includes an alternator 14 for driving an ac motor 16 (e.g., coupled through a differential to multiple wheels) via a rectifier 18 and an inverter 20. (As another example, alternator 14 may be employed to drive multiple wheel motor configurations, each containing an ac motor and an inverter.) As shown, motor speed feedback is provided by a tachometer 21. Inverter 20 is controlled by inverter/motor controls 22 and is further shown as being coupled to a dynamic brake resistor (R) and associated controls 24 for regulating current to provide power dissipation during negative torque operation, thus preventing buildup of an excessive voltage on the inverter's dc link during braking.

In operation, operator commands are provided, for example, by accelerator and brake pedals 26 and 27, respectively, and converted to a torque command T* by a torque schedule block 28 in conventional manner. The torque command T* is provided to inverter/motor controls 22 for determining the torque output of motor 16. The torque command T* is also multiplied by the motor speed from tachometer 21 in multiplier 30 to provide a motor power command P*. Torque feedback from inverter/motor controls 22 is multiplied in another multiplier 32 by motor speed to provide power feedback to a summer 34 wherein the power command P* is compared thereto. A preferred torque feedback system and associated motor/inverter controls are described in commonly assigned U.S. Pat. No. 5,166,593 of De Doncker et al. entitled "Closed-Loop Torque Feedback for a Universal Field-Oriented Controller", issued Nov. 24, 1992 and incorporated by reference herein. The resulting difference signal from summer 34 is provided to another summer 36 via a proportional-integral (PI) compensator 38.

Motor speed from tachometer 21, via a gain block 40, and the torque feedback from inverter/motor controls 22 are provided to a power loss estimation block 42 for estimating power losses in alternator 14, rectifier 18 and motor 16, based on stored power loss data as a function of motor speed and torque. In addition, FIG. 1 shows the input of two additional power loss terms, Pacc and Pgr, comprising power estimates for electric accessories and grade-climbing, respectively. Summer 36 adds the power loss estimate Ploss from estimate block 42 to the compensated difference signal from PI compensator 38, resulting in a heat engine power command Phe*. The heat engine power command Phe* is provided to heat engine 10 which, in turn, provides an alternator power command Pa* to alternator 14.

Figure 2:
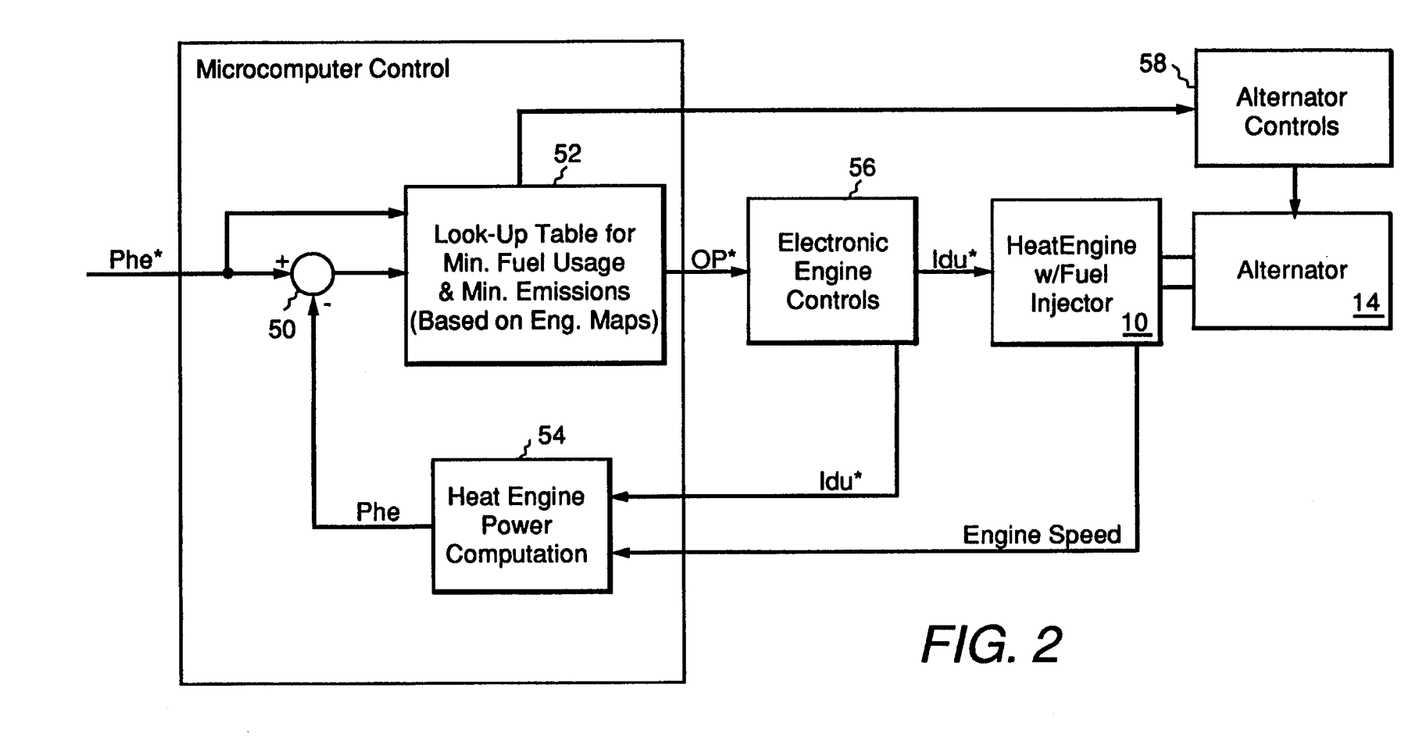
FIG. 2 is a block diagram illustrating the closed-loop power-controlled heat engine used in the electric drive system of FIG. 1.

FIG. 2 illustrates the closed-loop, power-controlled heat engine in detail. The heat engine power command Phe* is provided to a summer 50 and a look-up table block 52. Summer 50 compares the heat engine power command Phe* to a computed heat engine power Phe from a heat engine power computation block 54. Heat engine power computation block 54 computes heat engine power from a fuel injector duty cycle command Idu* and measured heat engine speed.

Figure 3A:
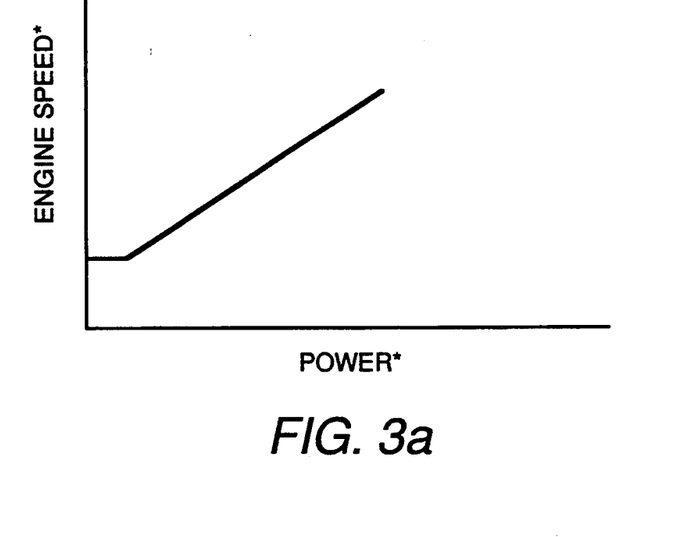
FIGS. 3a and 3b graphically illustrate heat engine operating point command curves (torque and speed versus power) that are based on minimum fuel usage and minimum emissions data used in control of the heat engine of FIG. 2.
Figure 3B:
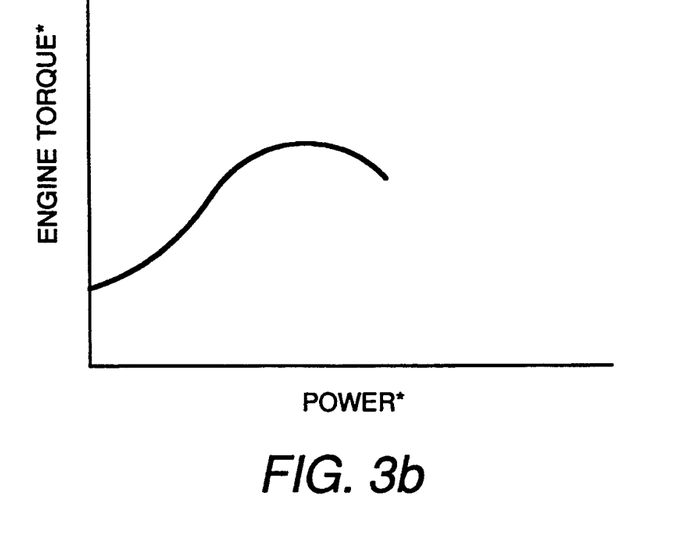

The heat engine power difference signal from summer 50 is provided, along with the heat engine power command Phe* and the heat engine speed, to block 52 which comprises look-up tables for determining minimum fuel usage and minimum emissions based on engine maps. Engine maps are derived from laboratory tests of the engine operating at steady-state power levels up to the maximum power available, i.e., 100% power fraction, for a given engine speed. Specifically, data measurements of engine emissions and fuel consumption for the range of engine power are collectively referred to as an engine map. From an engine map, minimum fuel consumption for a given power command is determined at the point where the Brake Specific Fuel Consumption (BSFC) curve for the particular heat engine is a minimum. Additionally, from an engine map, the engine operating point (torque and speed) where the minimum emissions occur for a given power level is derived and stored in look-up tables. An exemplary look-up table for block 52 is based on data such as that illustrated by the graph of FIG. 3. The look-up table for block 52 thus determines the optimum operating point for minimizing fuel usage and emissions and generates an operating point command OP* corresponding thereto. The operating point command signal OP*, typically a torque command signal or a torque and speed command signal, is provided to heat engine controls 56. Heat engine controls 56 generate the aforementioned fuel injector duty cycle command Idu* from the operating point command signal OP* The duty cycle command Idu* determines throttle position of the heat engine. As illustrated in FIG. 2, summer 50, look-up table block 52 and heat engine power computation block 54 are preferably implemented in a microcomputer.

Advantageously, the continuously variable transmission of the present invention for operating a heat engine in a closed-loop, power-controlled mode, as described hereinabove, decouples the heat engine speed from the vehicle or wheel speed such that heat engine operation is optimized as a function of power to minimize emissions and maximize fuel economy. Furthermore, fast transients resulting from operator input commands and gear shifts are avoided.

Figure 4:
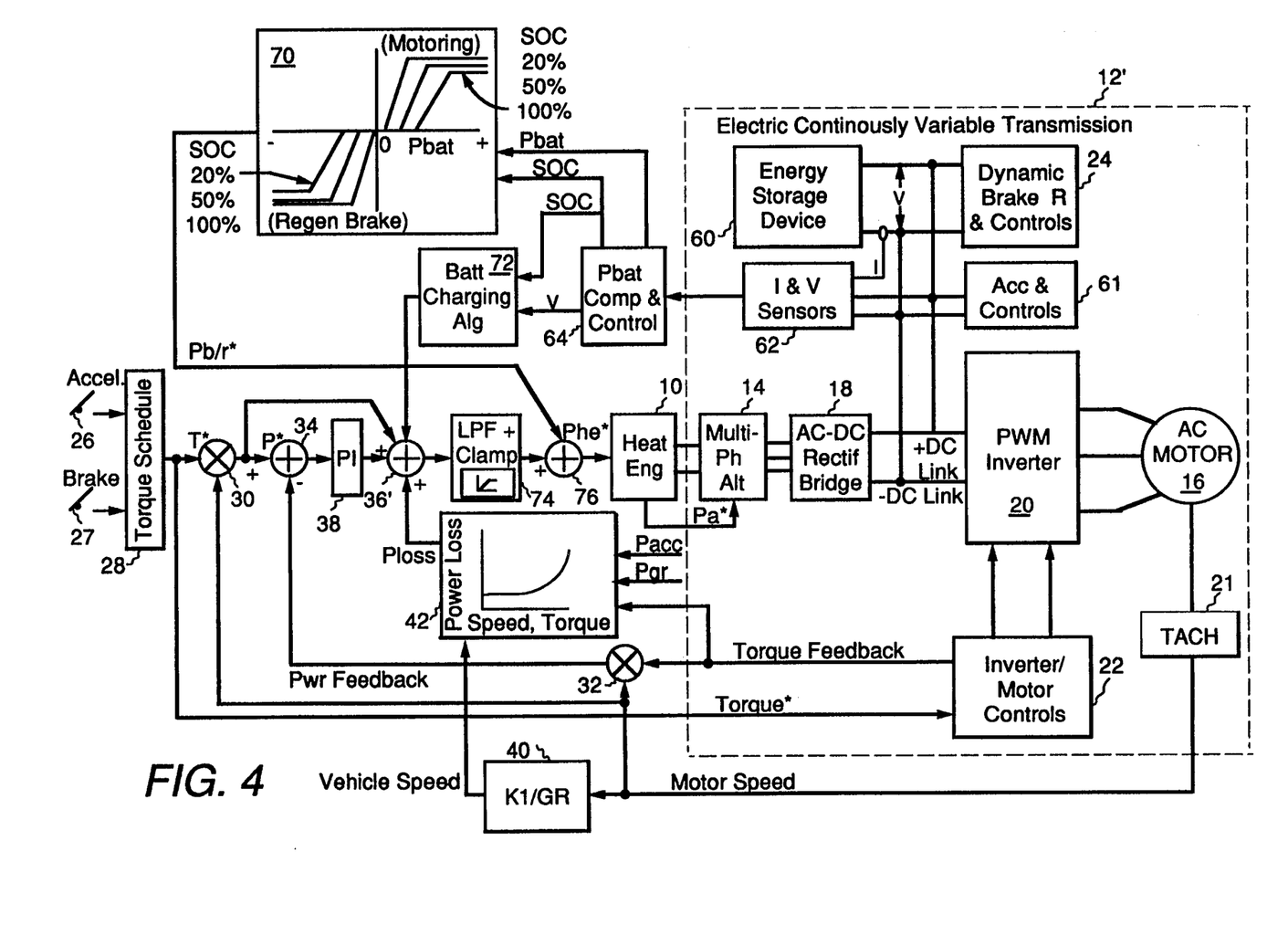
FIG. 4 illustrates an alternative embodiment of an electric drive system employing an electric continuously variable transmission with a heat engine and one or more energy storage devices according to the present invention.

FIG. 4 illustrates an alternative and preferred embodiment of the electric drive system of the present invention wherein a battery and/or other energy storage device 60 is employed to supply power to the electric continuously variable transmission in order to reduce peak power demands on heat engine 10. Other suitable energy storage devices include, for example, flywheels, ultracapacitors, superconducting magnetic energy storage devices (SMES'), or any combination thereof. A system with two or more propulsion sources, at least one source being electric, is referred to as a hybrid-electric drive system with a hybrid-electric continuously variable transmission. FIG. 4 also shows a block 61 representing electrically driven accessories (e.g., air conditioning, power steering, power brakes, an alternator or a dc-dc converter, air compressor, and so on) and associated controls coupled to energy storage device 60. By way of example only, energy storage device 60 will be referred to herein as a battery. Current (I) and voltage (V) sensors, illustrated collectively by block 62, provide measurements of battery current and voltage, respectively, to a battery power computation and control block 64 for calculating the battery power (during discharging as well as charging) and the battery's state-of-charge (SOC). The battery's SOC is defined in terms of the percentage of the maximum charge capacity of the battery. Another input to block 64, via a logic block 67, is the polarity of the torque command T*. Typically, during motoring in the forward direction, the torque command T* is positive; and during generating, the torque command T* is negative. Battery power computation and control block 64 is preferably implemented in a microprocessor using well-known techniques that measure net ampere-hours removed from the battery after being fully charged, including a correction factor based on battery temperature and, if desired, battery age. The polarity of the battery power signal Pbat determines whether the battery is being discharged or charged; typically, Pbat is assumed to be positive during discharging and negative during charging.

The battery power Pbat and SOC signals are inputs to a function block 70 for providing a dynamic boosting or retarding of the heat engine power, and hence alternator power, as described hereinbelow. In general, the function of the battery control loop (represented by blocks 64, 70 and 72) is to control the charging and discharging of the battery within its normal operating range by closed-loop control of the heat engine and alternator power levels, Phe* and Pa*, respectively, for a given value of the motor power command P*. However, even as the battery voltage V varies, alternator operation is controlled by the alternator power command Pa* and within the designed operating range for the alternator (i.e., within the current and voltage limits of the alternator). A normal operating range of battery voltage is, for example, from approximately 75% to 125% of the nominal voltage of the battery. Advantageously, in the electric drive system of the present invention, an electronic chopper is not required to match the voltages of the battery, alternator and dc link.

The battery power and computation block 64 provides the SOC signal and the battery voltage signal V to a battery charging algorithm block 72 for charging the battery in accordance therewith. The output signal from block 72 is provided to summer 36' and added therein to the compensated output signal from PI compensator 38 and the power loss estimate Ploss from block 42. The output signal from summer 36' is provided via a low pass filter and clamp block 74 to another summer 76 wherein it is added to the dynamic boost/retard signal Pb/r* from block 70. The resulting heat engine power command Phe* is provided to heat engine 10.

During motoring operation, the signal Pbat is positive. For this embodiment, as indicated in block 70 of FIG. 4, for positive values of the signal Pbat, the output of block 70 is a linear function of the signal Pbat with an adjustable clamp according to the battery's SOC. However, block 70 is not limited to the function shown; i.e., the function may be different depending on the particular energy storage unit and application. As the SOC decreases, the slope of the function increases and the level of the adjustable clamp also increases. As a result, when the power being supplied from the battery approaches its maximum discharge current (i.e., during vehicle accelerations), the output of function block 70 provides a dynamic boost of the heat engine power Phe* and the alternator power Pa*. At higher SOC levels, the battery power signal Pbat is larger before the dynamic power boost is applied, and the value of the clamp function is lower. At relatively low motor power (i.e., low P* from multiplier 30), and when the battery's SOC is above a predetermined threshold, no dynamic boost is required, and the engine runs at approximately the desired average power required to drive the vehicle, as determined by the motor power command P*, while the battery and electric drive system are used to supply peak power (up to the power limit of the battery for the particular SOC). As motor power P* increases, the value of the heat engine command Phe* is slowly increased via the low pass filter and clamp block 74 to the value commanded by the driver of the vehicle as determined in multiplier 30 by the torque command T* from block 28 and the motor speed signal, thereby minimizing emissions that would otherwise result from a fast transient in the heat engine operating point.

During regenerative braking, the electric motor operates as a generator, and regenerative braking power is supplied to the battery; i.e., Pbat is negative. When the battery is able to accept recharge power (i.e., at relatively low values of SOC), function block 70 provides for higher levels of negative Pbat before retarding the heat engine power command Phe*, via the dynamic power boost/retard command Pb/r*. However, when the battery is nearly fully charged (i.e., SOC is approaching 100%), relatively low values of negative power Pbat are allowed before the dynamic power signal Pb/r* quickly retards the heat engine power command Phe*, thus allowing maximum recharging of the battery through regenerative braking. As the level of regenerative braking power is decreased, the value of negative Pbat decreases, and function block 70 ramps the dynamic power retard signal Pb/r* to zero, so that the heat engine power command Phe* is slowly increased, thereby minimizing emissions that would otherwise result from a fast transient in the heat engine operating point.

Figure 5:
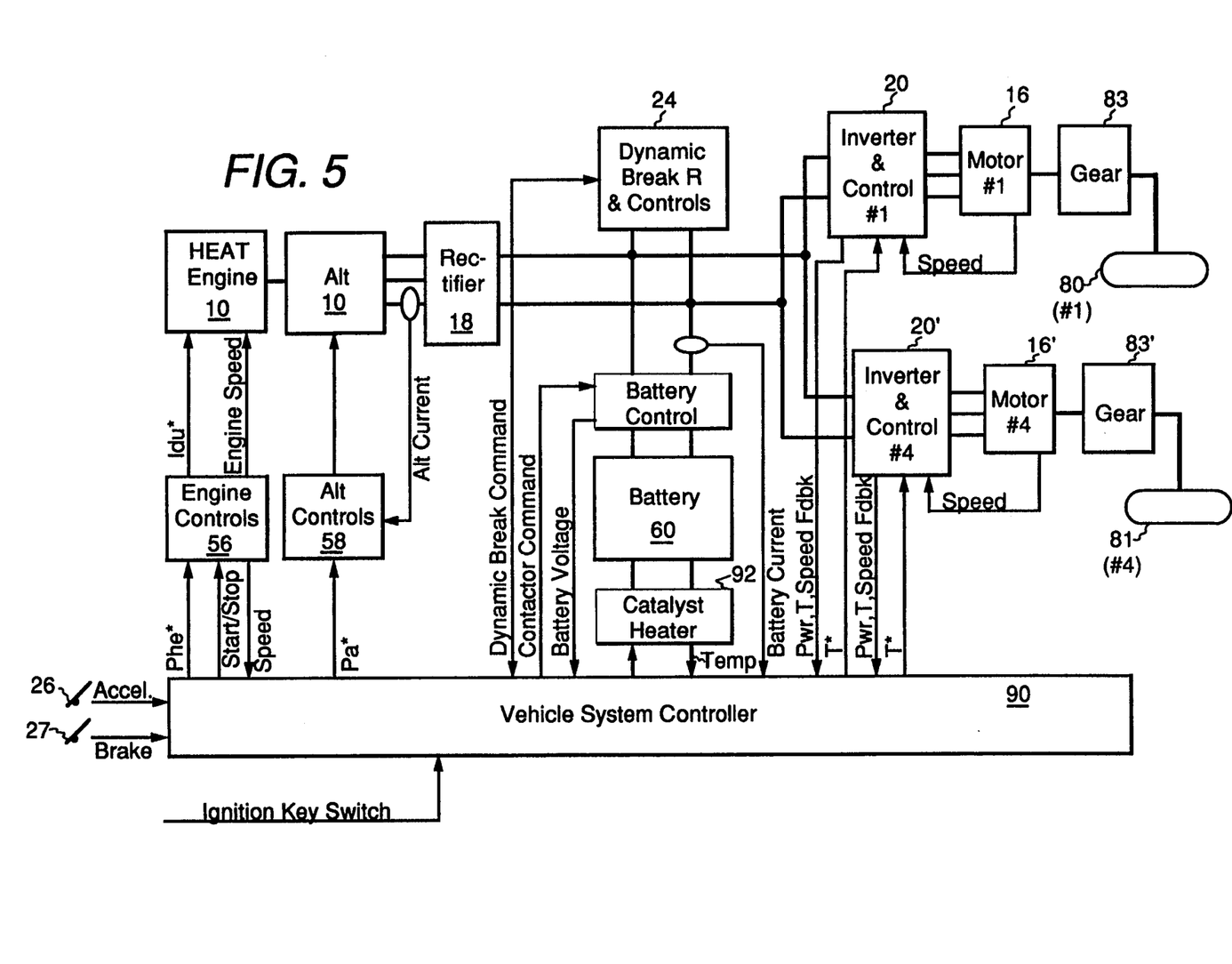
FIG. 5 is a block diagram illustrating a hybrid-electric vehicle employing the drive system of FIG. 4.

FIG. 5 illustrates a drive system for a four-wheel drive hybrid-electric vehicle according to the present invention. It is to be understood, however, that the four-wheel drive of FIG. 5 is shown by way of example only and that other drive configurations (e.g., one motor driving through a differential to multiple wheels, or two-wheel motor configurations, or six-wheel or more motor configurations) may be constructed according to the principles of the present invention. In the hybrid-electric vehicle drive of FIG. 5, wheels 80 and 81 (#1 and #4, respectively) are specifically illustrated as being driven by inverters 20 and 20' and motors 16 and 16', respectively, via gears 83 and 83', respectively. Wheels #3 and #4 (not shown) are similarly driven by separate respective inverters, motors and gears. A vehicle system control block 90, which receives the on/off commands from an ignition key switch and the operator commands from the accelerator and brake pedals, includes the microcomputer controls described with reference to FIG. 2. In addition, for multiple motors, as shown, control block 90 includes means for summing the motor power feedback from each motor to provide a total motor power command. Similarly, control block 90 includes means for summing the torque feedback from each motor to provide a total torque command.

In a preferred embodiment, the hybrid-electric vehicle drive system further includes a catalyst heater 92, as shown in FIG. 5, which is operated by battery 60, as illustrated, or, alternatively, by alternator 14. Prior to cold-starts of the heat engine or during operation thereof at relatively low power levels, electrical power is supplied by the catalyst heater to quickly heat and maintain a heat engine catalyst at a predetermined temperature (e.g., in the range from about 300 to 500 °C). Advantageously, therefore, the heat engine can be turned off during long idle periods, such as during traffic jams, and then restarted with a preheated catalyst, thereby minimizing resulting emissions as compared with a conventional vehicle drive system.

Advantageously, a hybrid vehicle employing an electric continuously variable transmission according to the present invention requires a significantly smaller heat engine than used in conventional vehicles. In addition, the use of multiple, independent wheel motors eliminates the need for the heavy transmission and bulky axle/differential assemblies of conventional power trains. Moreover, closed-loop power control of the heat engine to operate in its most efficient operating region in accordance with the present invention results in a system which maximizes fuel economy while minimizing emissions.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An electric continuously variable drive system, comprising:
   an ac motor;
   input means for receiving an operator command, said operator command being converted to a torque command for determining the torque output of said motor;
   an alternator for supplying electrical power to said ac motor via a rectifier and an inverter, said alternator being controlled by an alternator power command and operating in a closed-loop power mode within a normal operating range for said alternator;
   a heat engine for driving said alternator, said heat engine operating in a closed-loop power mode;
   heat engine control means for electronically controlling said heat engine via an injector duty cycle command or a throttle position command;
   torque feedback means for measuring actual torque produced by said ac motor;
   motor speed feedback means for measuring motor speed;
   heat engine speed feedback means for measuring heat engine speed;
   means for deriving a motor power command from said torque command and said motor speed;
   means for deriving a heat engine power command from said motor power command;

heat engine power computation means for computing actual heat engine power from said heat engine speed and said injector duty cycle command or said throttle position command;

comparison means for comparing said heat engine power command to the actual heat engine power and generating a difference signal therefrom; and heat engine operating point command means for receiving said heat engine power command, said difference signal and said heat engine speed and providing an operating point signal to said heat engine control means to control said heat engine in order to minimize fuel usage and emissions thereby.

2. The electric continuously variable drive system of claim 1, further comprising:

power loss estimation means for estimating power losses in said alternator, said rectifier, said inverter and said motor, said means for deriving a heat engine power command including the power loss estimate from said power loss estimation means to derive said heat engine power command.

3. The electric continuously variable drive system of claim 2 wherein said power loss estimation means further includes means for calculating an accessory power, said accessory power also being used in deriving said heat engine power command.

4. The electric continuously variable drive system of claim 1, further comprising dynamic brake means for regulating current to provide power dissipation during negative torque operation of said motor.

5. The electric continuously variable drive system of claim 1 wherein said heat engine further comprises a heat engine catalyst, said electric drive system further comprising catalyst electric heater means for maintaining said heat engine catalyst in a predetermined temperature range during operation thereof.

6. An electric continuously variable drive system, comprising:

a plurality of ac motors;

input means for receiving an operator command, said operator command being converted to a torque command for determining the torque output of said motors;

an alternator for supplying electrical power to said ac motors via a rectifier and an inverter associated with each respective motor, said alternator being controlled by an alternator power command and operating in a closed-loop power mode within a normal operating range for said alternator;

a heat engine for driving said alternator, said heat engine operating in a closed-loop power mode;

heat engine control means for electronically controlling said heat engine via an injector duty cycle command or a throttle position command;

torque feedback means for measuring actual torque produced by each of said ac motors and for deriving a total torque command therefrom;

motor speed feedback means for measuring motor speed for each respective motor;

heat engine speed feedback means for measuring heat engine speed;

means for deriving a motor power command from said total torque command and the motor speed feedback from each of said motors and further for deriving a total motor power command therefrom;

means for deriving a heat engine power command from said total motor power command;

heat engine power computation means for computing actual heat engine power from said heat engine speed and said injector duty cycle command or said throttle position command;

comparison means for comparing said heat engine power command to the actual heat engine power and generating a difference signal therefrom; and heat engine operating point command means for receiving said heat engine power command, said difference signal and said heat engine speed and providing an operating point signal to said heat engine control means to control said heat engine in order to minimize fuel usage and emissions thereby.

7. The electric continuously variable drive system of claim 6, further comprising:

power loss estimation means for estimating power losses in said alternator, said rectifier, said inverter and said motor, said means for deriving a heat engine power command including the power loss estimate from said power loss estimation means to derive said heat engine power command.

8. The electric continuously variable drive system of claim 7 wherein said power loss estimation means further includes means for calculating an accessory power, said accessory power also being used in deriving said heat engine power command.

9. The electric continuously variable drive system of claim 6, further comprising dynamic brake means for regulating current to provide power dissipation during negative torque operation of said motors.

10. The electric continuously variable drive system of claim 6 wherein said heat engine further comprises a heat engine catalyst, said electric continuously variable drive system further comprising catalyst electric heater means for maintaining said heat engine catalyst in a predetermined temperature range during operation thereof.

11. The electric continuously variable drive system of claim 6 wherein each respective ac motor drives a wheel of a vehicle.

12. An electric continuously variable drive system for an electric drive, comprising:

an ac motor;

input means for receiving an operator command, said operator command being converted to a torque command for determining the torque output of said motor;

an alternator for supplying electrical power to said ac motor via a rectifier and an inverter, said alternator being controlled by an alternator power command and operating in a closed-loop power mode within a normal operating range for said alternator;

a heat engine for driving said alternator, said heat engine operating in a closed-loop power mode;

heat engine control means for electronically controlling said heat engine via an injector duty cycle command or a throttle position command;

torque feedback means for measuring actual torque produced by said ac motor;

motor speed feedback means for measuring motor speed;

heat engine speed feedback means for measuring heat engine speed;

means for deriving a motor power command from said torque command and said motor speed;

means for deriving a heat engine power command from said motor power command;

heat engine power computation means for computing actual heat engine power from said heat engine speed and said injector duty cycle command or said throttle position command;

comparison means for comparing said heat engine power command to the actual heat engine power and generating a difference signal therefrom;

heat engine operating point command means for receiving said heat engine power command, said difference signal and said heat engine speed and providing an operating point signal to said heat engine control means to control said heat engine in order to minimize fuel usage and emissions thereby; and energy storage means for providing electrical energy to said electric continuously variable drive system for reducing peak power demands on said heat engine, said energy storage means recovering energy from said motor during regeneration.

13. The electric continuously variable drive system of claim 12, further comprising:

power loss estimation means for estimating power losses in said alternator, said rectifier, said inverter and said motor, said means for deriving a heat engine power command including the power loss estimate from said power loss estimation means to derive said heat engine power command.

14. The electric continuously variable drive system of claim 13 wherein said power loss estimation means further includes means for calculating an accessory power, said accessory power also being used in deriving said heat engine power command.

15. The electric continuously variable drive system of claim 12, further comprising dynamic brake means for regulating current to provide power dissipation during negative torque operation of said motor.

16. The electric continuously variable drive system of claim 12 wherein said heat engine further comprises a heat engine catalyst, said electric drive system further comprising catalyst electric heater means for maintaining said heat engine catalyst in a predetermined temperature range during operation thereof.

17. The electric continuously variable drive system of claim 12, further comprising:

energy storage control means for controlling charging and discharging of said energy storage means within a normal operating power range and within predetermined state-of-charge limits by closed-loop control of the heat engine power and the alternator, such that said heat engine power command is boosted at relatively high peak power demands, is retarded during moderate to high levels of regenerative braking, and otherwise remains at predetermined average levels.

18. The electric continuously variable drive system of claim 12 wherein said energy storage means is selected from the group consisting of at least one battery, flywheel, ultracapacitor, superconducting magnetic energy storage device, and any combination thereof.

19. An electric continuously variable drive system for an electric drive, comprising:

a plurality of ac motors;

input means for receiving an operator command, said operator command being converted to a torque command for determining the torque output of said motors;

an alternator for supplying electrical power to said ac motors via a rectifier and an inverter associated with each respective motor, said alternator being controlled by an alternator power command and operating in a closed-loop power mode within a normal operating range for said alternator;

a heat engine for driving said alternator, said heat engine operating in a closed-loop power mode;

heat engine control means for electronically controlling said heat engine via an injector duty cycle command or a throttle position command;

torque feedback means for measuring actual torque produced by each of said ac motors and for deriving a total torque command therefrom;

motor speed feedback means for measuring motor speed for each respective motor;

heat engine speed feedback means for measuring heat engine speed;

means for deriving a motor power command from said total torque command and the motor speed feedback from each of said motors and further for deriving a total motor power command therefrom;

means for deriving a heat engine power command from said total motor power command;

heat engine power computation means for computing actual heat engine power from said heat engine speed and said injector duty cycle command or said throttle position command;

comparison means for comparing said heat engine power command to the actual heat engine power and generating a difference signal therefrom;

heat engine operating point command means for receiving said heat engine power command, said difference signal and said heat engine speed and providing an operating point signal to said heat engine control means to control said heat engine in order to minimize fuel usage and emissions thereby; and energy storage means for providing electrical energy to said electric continuously variable drive system for reducing peak power demands on said heat engine, said energy storage means recovering energy from said motors during regeneration.

20. The electric continuously variable drive system of claim 19, further comprising:

power loss estimation means for estimating power losses in said alternator, said rectifier, said inverter and said motor, said means for deriving a heat engine power command including the power loss estimate from said power loss estimation means to derive said heat engine power command.

21. The electric continuously variable drive system of claim 20 wherein said power loss estimation means further includes means for calculating an accessory power, said accessory power also being used in deriving said heat engine power command.

22. The electric continuously variable drive system of claim 19, further comprising dynamic brake means for regulating current to provide power dissipation during negative torque operation of said motor.

23. The electric continuously variable drive system of claim 19 wherein said heat engine further comprises a heat engine catalyst, said electric continuously variable drive system further comprising catalyst electric heater means for maintaining said heat engine catalyst in a predetermined temperature range during operation thereof.

24. The electric continuously variable drive system of claim 19, further comprising:

energy storage control means for controlling charging and discharging of said energy storage means within a normal operating power range and within predetermined state-of-charge limits by closed-loop control of the heat engine power and the alternator, such that said heat engine power command is boosted at relatively high peak power demands, is retarded during moderate to high levels of regenerative braking, and otherwise remains at predetermined average levels.

25. The electric continuously variable drive system of claim 19 wherein said energy storage means is selected from the group consisting of at least one battery, flywheel, ultracapacitor, superconducting magnetic energy storage device, and any combination thereof.

26. The electric continuously variable drive system of claim 19 having a unity gear ratio.

27. The electric continuously variable drive system of claim 19 wherein each respective ac motor drives a wheel of a hybrid-electric vehicle.

* * * * *